Patented Jan. 8, 1946

2,392,767

UNITED STATES PATENT OFFICE 2,392,767

SILICIC ACID PRODUCT AND PROCESSES FOR PRODUCING SAME

John W. Robinson, Jr., Lakewood, Ohio, assignor to E. I. du Pont de Nemours & Company, Wilmington, Del., a corporation of Delaware No Drawing. Application April 21, 1943,
Serial No. 483,966

22 Claims. (Cl. 23—182)

This invention relates to silicic acid; is more particularly directed to the production of low molecular weight polysilicic acid compositions by processes in which a liquid complex of low molecular weight polysilicic acid and an organic hydrogen bonder is isolated and the hydrogen bonder is separated from the complex by solvent extraction; and is further directed to compositions consisting essentially of low molecular weight polysilicic acid which may be prepared by such processes.

Silicic acid in the form of dilute aqueous solutions has been prepared by a variety of methods such as the neutralization of a soluble silicate with an acid, the dialysis of a soluble silicate, or the hydrolysis of a silicon halide or an ester of silicic acid. The usefulness of the silicic acid prepared by such methods has been very restricted by reason of the instability of the compositions, their low silicic acid content, their tendency to form gels, and their association with impurities such as salts. Under some conditions the products precipitate as partially hydrated silica. These and other difficulties of preparing and handling silicic acid have discouraged commercial interest.

Recently, methods have been proposed for producing stable compositions in which relatively high concentrations of low molecular weight polysilicic acid are associated, as complexes, with organic hydrogen bonding donor compounds. It has been proposed to salt out the complexes and thereby to isolate these relatively stable compositions. While the availability of such complexes has extended enormously the usefulness of silicic acid, the presence of the hydrogen bonder associated with the silicic acid is in some cases not desired. For instance, for some purposes a silicic acid composition is wanted in which the silicic acid has low molecular weight but is capable of rapid polymerization, and the presence of the hydrogen bonder may undesirably retard polymerization. Furthermore, many of the more effective hydrogen bonding donor compounds are relatively expensive and their conjoint use with the silicic acid adds to the expense of processes employing such compositions. Again, in the use for which a silicic acid-bonder complex is intended, the continued presence of the bonder may be undesirable, but the bonder might be difficult to remove by such procedures as evaporation or other commonly employed methods, and it may thus become desirable to replace the bonder with a more easily handled material before applying the silicic acid to its intended purpose. More particularly, it may be desirable to replace a non-volatile bonder with a more volatile material which can be evaporated off in the ultimate application of the silicic acid.

It is an object of this invention to provide improved processes for the production of low molecular weight polysilicic acid compositions. Another object is to provide processes for producing polysilicic acid solutions in relatively inexpensive solvents. Another object is to provide processes for producing polysilicic acid solutions having predetermined stabilities. Another object is to provide processes for the recovery of hydrogen bonders from their complexes with low molecular weight polysilicic acid. Another object is to provide processes whereby non-volatile hydrogen bonders associated with low molecular weight polysilicic acid may be replaced with more volatile solvents for the silicic acid. Another object is to provide compositions consisting essentially of low molecular weight polysilicic acid and processes for their preparation. Further objects will appear hereinafter.

The foregoing and other objects are accomplished according to this invention by processes comprising isolating a liquid complex of low molecular weight polysilicic acid and an organic hydrogen bonder, and separating the hydrogen bonder from the complex by solvent extraction, and are further accomplished by compositions consisting essentially of low molecular weight polysilicic acid which may be produced by such processes.

According to this invention, the formation of a complex of low molecular weight polysilicic acid with an organic hydrogen bonding donor compound is used as a means for isolating silicic acid into a form from which the hydrogen bonder is subsequently removed by suitable methods. For a proper understanding of the invention a comprehension of the theory of hydrogen bonding may therefore be useful.

Hydrogen bonding is a concept advanced in recent years to explain certain abnormalities in the chemical and physical behavior of mixtures of compounds one of which, the acceptor, contains hydrogen attached to a strongly negative radical and the other, the donor, contains an atom capable of donating a pair of electrons to form a type of co-ordinate bond. Since the bond is formed by the donation of an electron pair from one atom, the donor, to the other atom the bond is not of the type conceived of as an ordinary co-valent bond but many of the properties of the mixture indicate that a type of chemical compound is formed. This concept of hydrogen bonding is well understood in the art, and its application to silicic acid is discussed in Kirk U. S. Patent 2,276,315.

According to this Kirk patent, it has been found that when silicic acid is mixed with an organic hydrogen bonding donor compound the mixture exhibits characteristics unexplainable upon the basis of ordinary chemical reaction and unexpected from a consideration of the characteristics of the materials mixed. Apparently silicic acid has an acceptor hydrogen atom and forms some type of compound with a hydrogen bonding donor. Among the characteristics of these silicic acid-hydrogen bonding donor combinations is a decreased tendency to precipitate gelatin and an increase in the time required for the sol to be converted to the gel.

It will be understood that in advancing the theory of hydrogen bonding to describe the complexes of organic compounds with silicic acid which are formed as a step in the processes of the present invention, the theory is not intended as a limitation or restriction of the invention. The theory may or may not be correct, and for the purposes of the present invention it is of importance largely because, whatever the reason, the type of compounds known to be organic hydrogen bonding donors, hereinafter referred to as "hydrogen benders," provide with silicic acid the type of complexes which may be employed.

The hydrogen bonding donor compounds used in the processes of this invention should be sufficiently water soluble to permit formation of a coordination complex with silicic acid. The hydrogen bonder should not contain groups which will react with silicic acid to give compounds or precipitates of the conventional sort when such reaction would interfere with the hydrogen bonding. It is further to be noted that while some hydrogen bonding agents produce water insoluble complexes, it is often preferred to use only those hydrogen bonding agents which do not lead to any type of precipitate.

The organic hydrogen bonding donor compounds used in a process of this invention are preferably organic compounds containing at least one oxygen atom bonded to a carbon atom and are preferably selected from the group consisting of ethers, amides, ketones, alcohols, and esters of phosphorus oxy-acids.

ETHERS

Ethers are among the most effective of hydrogen bonding agents for use with silicic acid according to the present invention. Donors of this class, in addition to containing an ether group, may advantageously contain an oxygen or nitrogen atom in addition to that in the ether linkage and may contain, say, an additional ether group, a hydroxy group, an amide group, or an ester group. The presence of these groups appears very beneficial. A number of such groups may be present and there may be used, for instance, polyethers which contain hydroxyl groups and ester groups.

As examples of ethers the following are listed:

Nonaethylene glycol
Dimethyl ether of tetraethylene glycol
Dimethyl ether of diethylene glycol
Hexaethylene glycol
Butyl ether of diethylene glycol
Ethyl ether of diethylene glycol acetate
Methyl ether of diethylene glycol acetate
Tetraethylene glycol
Monoethyl ether of diethylene glycol
Triethylene glycol
Monoethyl ether of ethylene glycol
Diethylene glycol
N,N'-bis(beta-methoxyethyl) adipamide
Polyethylene glycol adipate
Diethyl ether of diethylene glycol
Dioxane
Dioxolane
Diethyl ether of ethylene glycol
Dimethyl ether of ethylene glycol
Triethylene glycol dipropionate
N,N'-dimethylmethoxyacetamide
N,N'-adipyldimorpholine
Dimorpholide urea
Polyethylene oxide The term "ether" will be understood to refer to organic compounds containing a carbon-oxygen-carbon group in which the carbon atoms attached to the oxygen are not directly attached to each other.

Polyethers obtained by the polymerization or interaction of ethylene oxide, propylene oxide, and the like with other organic substances are useful in modifying silicic acid by reason of ether groups which they contain. The following are examples of such reaction products:

Monomethyl ether of ethylene glycol-ethylene oxide reaction product
Ethylene glycol-ethylene oxide reaction product
Glycerol-ethylene oxide reaction product
Ethanolformamide-ethylene oxide reaction product

AMIDES

Amides are among the preferred hydrogen bonding donors for use with silicic acid according to this invention. Whereas oxygen is the donor atom in ethers, the nitrogen of amides probably acts as the donor atom. Among the most effective compounds of this group are the N-substituted amides, and the di-substituted compounds are preferred.

Examples of amides are listed below, ureas and other amides being listed separately:

Ureas

Tetramethylurea
Tetraethylurea

Amides

N,N,N',N'-tetramethyladipamide
N,N-dimethylacetamide
N,N,N',N'-tetramethylsuccinamide
N,N,N',N'-tetraethylsuccinamide
N,N, diethylacetamide
N,N,N',N'-tetraethyloxamide
N,N-diethylformamide
N,N-diethylpropionamide
N,N-diethylglycolamide
N-butyl-N-beta-hydroxyethyllactamide
N-isobutylacetamide
N-formylhexamethylenimine
Diethylcyanamide

KETONES

Ketones are among the effective hydrogen bonding agents for use with silicic acid according to the present invention. Donors of this class in addition to containing a keto group may advantageously contain an oxygen in addition to that in the keto linkage or a nitrogen atom, and may contain, say, an ether group, an amide group, or an ester group. The presence of these groups appears very beneficial. A number of such groups may be present.

As examples of ketones, the following are listed:

Acetone
Acetonyl acetone
Formacetoethyl ketone
Methyl acetoacetate
Diacetone alcohol
Diacetyl ketone

ETHERS OF PHOSPHORUS OXY-ACIDS

Esters of phosphorus oxy-acids are also among the preferred hydrogen bonding doners for use with silicic acid according to this invention. It appears likely that the oxygen in such compounds functions as the donor atom.

Examples of esters of phosphorus oxy-acids which are effective in processes of this invention are listed below:

Tributyl phosphate
Triethyl phosphate
Phenylphosphoric dimorpholide
Triisoamyl phosphate
Triisopropyl phosphate
Trihexyl phosphate
Tri(monobutyl ether of diethylene glycol) phosphate

ALCOHOLS

Alcohols are also among the preferred hydrogen bonding donors for use with silicic acid according to this invention. Preferably the alcohol used should contain more than two carbon atoms and should have more than two carbon atoms per hydroxyl group.

Examples of alcohols which are effective according to this invention are listed below:

Diacetone alcohol
2 methyl-2,4-pentanediol
Isopropanol
Pinacol
Hexamethylene glycol
Pentaglycol
Tert-butyl alcohol
Tetrahydroxy octanol
1,1,1-trimethylolethane
Propanediol
n-Butanol From the foregoing description the nature of the hydrogen bonding donor compound used with silicic acid to make complexes as a step in the processes of this invention will be readily apparent.

In making hydrogen bonder complexes, the polysilicic acid employed should have low molecular weight. Silicic acid, prepared for instance, by acidulating a soluble silicate, immediately begins to polymerize rapidly and unless the polymerization is arrested, a rigid silica gel or a precipitate of silicic acid particles is formed. When such polymerization has proceeded to the point where a gel or precipitate is formed, the silicic acid is no longer of the low molecular weight type contemplated for use in the present invention. The term "low molecular weight" is not, however, to be construed as meaning that all of the silicic acid is in the monomeric form. Rather, this term is used herein to indicate a polysilicic acid in which polymerization has not proceeded to such an extent that the physical and chemical characteristics of the acid are preeminently those of a polymerized product.

When a silicic acid solution in an aqueous medium passes from a low molecular weight to a high molecular weight, the apparent viscosity of the solution shows a rather sharp increase. This increase in viscosity can therefore be regarded as an indication of the occurrence of polymerization, and conversely silicic acid in an aqueous solution may be said to have low molecular weight if the viscosity of the solution does not show a sharp increase over the viscosity of the freshly prepared sol. When determining the viscosity of silicic acid the conditions should, of course, be such as to avoid errors due to thixotropy or dilatancy of the solution. The determination of the extent of polymerization in a silicic acid solution will ordinarily be readily apparent to one skilled in the art or can be determined by such simple procedures as observing the pouring characteristics of the solution, low molecular weight solutions being, of course, liquids which are highly mobile and readily pourable.

In a particularly preferred embodiment of this invention the relative molecular weight of a polysilicic acid solution and, hence, its relative suitability, may be established according to an empirical test as follows:

A sample of the polysilicic acid solution to be tested is adjusted at the time of the test to a pH of 1.6 and a combined silicon content, expressed as $SiO_2$, of about 4.5% by weight. To a 10 cc. sample of this solution there is added 1 cc. of a solution having a pH of 2.5 and containing 50 grams of diethyl ether of diethylene glycol per 100 cc. of solution. To this mixture is added 5 cc. of a solution having a pH of 2.5 and containing 2% by weight of edible grade gelatin (such as Keystone #546). There is then added a measured volume of a solution having a pH of 2.5 and containing 300 g. per liter of sodium chloride, this solution being run in from a burette with agitation, until the mixture becomes turbid with finely divided white precipitate. Then at once another 1 cc. of the solution of diethyl ether of diethylene glycol is added, which clears up the turbidity, and salt solution is further titrated in to turbidity. Further 1 cc. quantities of the glycol solution are added and salt again added to turbidity.

The total concentrations of salt and of diethyl ether of diethylene glycol are now calculated in terms of grams per 100 cc. of mixture at each turbid-point, i. e., for each different amount of the glycol used. In calculating the total salt content of the mixture account must be taken of any salts already present in the sample. If, for example, sodium chloride is present it must be taken into account. If sodium sulfate is present its equivalent of NaCl in salting-out power should be taken together with the NaCl in the titrating solution in calculating the total effective NaCl concentration in the system. To determine this equivalent, the titration can be carried out using $Na_2SO_4$ solutions of various concentrations instead of the standard salt solution until one is found which is equivalent in the titration to the standard NaCl solution. Thus, if 10 cc. of a solution of 210 grams per liter of a salt such as $Na_2SO_4$ (of the kind present in the sample of polysilicic acid solution) is found to be equivalent in this titration to 10 cc. of a solution of 280 grams per liter of NaCl, then for each gram of the salt (such as $Na_2SO_4$) present in the 10 cc. sample of the sol, the equivalent NaCl would be $280/10$ grams. This equivalent NaCl must be taken into account in calculating the total equivalent NaCl in the titration mixture at the point of turbidity.

Plotting these calculated values of percentage of total equivalent NaCl against the percentage of pure diethyl ether of diethylene glycol in the mixture at the point when it becomes turbid, a straight line is found. On extrapolating this line to the axis which represents the percentage of diethyl ether of diethylene glycol, an intercept on the axis is found that represents the percentage of this ether that would be present in the solution at the point of turbidity if it contained zero per cent NaCl.

As polysilicic acid solutions age or polymerize this intercept changes from about −6% to about +4%, the latter value being approached as the sol approaches the gel point, the change proceeding much more slowly as the value approaches +4%.

According to this invention it is preferred to use solutions which give a value of less than about +3%.

Various methods for producing silicic acid solutions are known in the art, and any of these methods may be used in the preparation of low molecular weight silicic acid solutions for use according to the processes of this invention, provided precautions can be taken to avoid immediate polymerization of the silica. Silicic acid solutions may be prepared by acidulating a solution of a soluble silicate, for instance, such as sodium, potassium, or ammonium silicate, with any suitable acid such as sulfuric, sulfamic, hydrochloric, nitric, thionic, lactic, acetic, or similar acids. Acid salts may also be used for the acidulation, sodium bisulfate, monosodium phosphate, sodium acid tartrate, zinc chloride, titanium sulfate, aluminum sulfate, and chromium sulfate, for instance, being suitable. The amount of acid or acidic material will ordinarily be such as to result in a pH of about 1.0 to 5.0.

Polysilic acid solutions may also be prepared by various other methods and may, for instance, be made by hydrolyzing organic esters of silicic acid or by hydrolyzing silicon halides or silicon sulfide; or naturally occurring minerals such as sodium aluminum silicate dissolved in acids may be employed.

Of the foregoing methods, it is preferred to make polysilicic acid solutions for use according to this invention by adding a sodium silicate solution to a solution of an acid, such as sulfuric acid, with violent agitation, the conditions being such that the pH of the mixture does not rise above about 2.

The manner of bringing sodium silicate into contact with acid is very important in producing a silicic acid solution of the desired kind. Thus, for best results it is necessary either that the sodium silicate be added to the acid or that the silicate and the acid be added simultaneously to a mixing zone and in either case that effective dispersion of the reactants at their point of contact be effected, and that the pH be maintained below about 3.0 and preferably below about 1.7. Effective dispersion of the reactants will be understood to mean that the reactants are brought together under conditions such that no substantial local concentration of one or the other is present at the point of mixing or thereafter. Ideally, the solution of silicic acid is maintained completely homogeneous at all times; this ideal is most closely approached by maintaining intense local agitation at the point of mixing as well as good general agitation of the silicic acid solution formed. In the preparation of the preferred compositions of this invention such effective agitation is provided.

The complex formed as a step in the processes of this invention may be produced by effecting contact between the hydrogen bonding agent and an aqueous solution of low molecular weight polysilicic acid. Such contact is facilitated by agitation, and in case the hydrogen bonding agent is of low solubility in water such agitation may advantageously be extended for a considerable time or until all of the silicic acid is associated as complex.

The proportion of bonder to silicic acid may be widely varied and will depend in a particular instance on the bonder used, its relative bonding efficiency, the concentration of polysilicic acid desired in the complex, the molecular weight of the polysilicic acid, and other circumstances and conditions of the particular case. It is to be remembered that the complexes are not compounds in the ordinary sense of the term but are more in the nature of equilibrium mixtures which by reason of the hydrogen bonding phenomenon have some of the attributes of chemical compounds. In the case of the hydrogen bonder triethyl phosphate, for instance, a complex is formed with low molecular weight polysilicic acid at ordinary temperatures in the proportion of one mole of triethyl phosphate per gram atom of silicon. If additional triethyl phosphate is used, the excess is soluble in the complex and remains associated with it. In the case of diethyl "Carbitol," on the other hand, a complex is formed in approximately the same proportion but excess diethyl "Carbitol" is not soluble in the complex and forms a phase separate from the complex.

The isolation of the silicic acid-hydrogen bonder complex as a step in the processes of this invention may be accomplished in any suitable manner. Whatever the method employed, it should be one which effects the separation before polymerization has proceeded to a pronounced extent. For instance, a complex may be formed between a hydrogen bonder and polysilicic acid prepared as by hydrolyzing ethyl silicate and separation of the complex as a separate phase may be effected by rapid distillation of water under reduced pressure. When this method is used the hydrogen bonder may distill off simultaneously and have to be replaced during the distillation.

A distinctly advantageous technique for effecting the separation of silicic acid-hydrogen bonder complex as a separate phase comprises adding a large proportion of a salt to an aqueous solution of the complex. The aqueous complex solution may, for instance, be saturated with common salt whereby the complex is thrown out of the brine as a separate phase which may then be separated gravitationally as by centrifuging or settling. This phase may, of course, be lighter or heavier than the brine, depending on the conditions used.

The material used to effect salting out should, of course, be water-soluble and chemically non-reactive with the hydrogen bonding donor compound or the polysilicic acid. The particular salt chosen should be used at such a pH that the corresponding metal silicate is not formed. Ordinarily such metal silicates will not form below pH 2.0. Fluorides operate as salting-out agents but simultaneously accelerate the gelling of silicic acid sols and their use is therefore avoided. While a variety of salts may be used, such as potassium chloride, potassium sulfate, potassium bromide, calcium chloride, zinc chloride, magnesium sulfate, magnesium chloride, copper sulfate, ammonium chloride, ammonium sulfate, ammonium sulfamate, barium chloride, sodium nitrate, ferrous sulfate, and ferric chloride, it is preferred to use sodium sulfamate, sodium chloride, or sodium sulfate because of their high order of effectiveness, low cost, and non-reactivity with silicic acid and hydrogen bonding donor compounds.

Having effected isolation of a hydrogen bonder-polysilicic acid complex by such a technique as the salting out above described, the complex may then be diluted, according to one embodiment of this invention, with a liquid, water-miscible diluent which is a solvent for polysilicic acid and is miscible with the bonder-polysilicic acid complex. A suitable solvent may, for instance, be a water soluble ketone, an alcohol, or water itself. If an alcohol is used, it may be mono-, di-, or tri-hydric, the alcohols ethanol, ethylene glycol, and glycerol, being suitable, for instance, while the monohydric alcohol, methanol, is particularly preferred. The diluent may itself have hydrogen bonding activity toward polysilicic acid but this does not interfere with, and may in fact enhance, its character as a solvent for the polysilicic acid. In order that there may be no confusion it will be understood that when the term "hydrogen bonder" is used herein it refers to the compound with which the polysilicic acid is in the first instance isolated.

For maximum stability of the polysilicic acid in the final product it is preferable that the diluent be substantially anhydrous.

The proportion of diluent to add will be largely governed by the particular conditions of each case, but in general there should be used a sufficient amount to hold the polysilicic acid in solution and in an ungelled condition after the bonder has been removed. It will be apparent that a relatively concentrated polysilicic acid solution may be obtained after removal of the bonder and this concentrated solution may then be diluted with additional diluent before gelation of the polysilicic acid has had time to occur. Preferably, however, enough diluent will be used in the first instance to give a solution sufficiently dilute, after bonder removal, to be relatively stable. When methanol is used as the diluent such stable ultimate solutions may satisfactorily contain as high as fifty per cent by weight of polysilicic acid, but preferably will contain from ten to twenty per cent. When water is the diluent, the proportion used must be much higher to attain stability, but for certain uses, where instability is desired or is immaterial, the proportion of water may be even lower.

In a particular embodiment of this invention the isolated polysilicic acid-hydrogen bonder complex may be dried to remove any residual free water present. If a diluent is used, such a drying step should preferably be carried out prior to dilution. If the hydrogen bonder or diluent used is also an esterifying agent, such drying of the complex may result in a partial esterification of the polysilicic acid, but nevertheless some non-esterified hydroxyl groups will remain and the final product may therefore be considered a polysilicic acid composition.

If no diluent is used and the bonder is not an esterifying agent, there is obtained as an ultimate product, after extraction of the hydrogen bonder, a composition consisting essentially of low molecular weight polysilicic acid. This composition is a thick, water-white, somewhat viscous liquid having the appearance of a concentrated sugar solution. Substantially the only water contained in it is the water in chemical combination as silicic acid. The composition polymerizes rapidly to form silica gels having unique properties.

For low molecular weight polysilicic acid solutions of maximum stability against polymerization it is preferred to include both the steps of drying and diluting.

From the suitably diluted bonder-polysilicic acid complex the solution of low molecular weight polysilicic acid in the diluent is caused to separate from the hydrogen bonder in a process of this invention by solvent extraction of the bonder, using as the extractant an organic liquid which is miscible with the bonder but immiscible with the polysilicic acid or polysilicic acid-bonder complex. The extractant suitably may be added to the silicic acid-bonder complex, diluted as desired, the mixture shaken, and the solution of bonder in the diluent caused to separate as a phase which is then removed by centrifuging or decantation.

The extractant used according to a preferred process of this invention may be characterized as an organic liquid relatively insoluble in water. In this capacity there may be used, for instance, an extractant selected from the group consisting of aromatic hydrocarbons, such as benzene, toluene, and xylene, aliphatic and cycloaliphatic hydrocarbons such as octane, decane, cyclohexane, or mixtures of paraffin hydrocarbons, preferably having a boiling point range of 40 to 200° C., and halogenated hydrocarbons such as carbon tetrachloride, chloroform, and dichlorethylene.

The proportion of extractant will depend on the particular circumstances of each case, but should be sufficient at least to extract a substantial portion of the bonder. It will be apparent that a continuous extraction may be employed in which the amount of extractant present at any given moment is relatively small, but the total amount used is relatively large. Preferably, the total proportion of extractant will be sufficient to extract the bonder completely.

It will be understood that if a diluent for the complex is used, it may be added simultaneously with the extractant if desired.

The nature of this invention is further demonstrated by the following illustrative examples:

EXAMPLE I

A solution of low molecular weight polysilicic acid was prepared by dissolving in water sodium silicate having an $SiO_2:Na_2O$ mol ratio of 3.37 to give a solution which was 1.82 molar with respect to $SiO_2$ and adding 554 cc. of this sodium silicate solution to 446 cc. of 1.58 normal sulfuric acid with violent agitation. After the addition of the silicate, the pH of the mixture was 1.7, and the temperature was 25° C.

A complex of polysilicic acid with a hydrogen bonding donor compound was then formed by adding to the silicic acid solution within one-half hour after its preparation 125 cc. of triethyl phosphate. The triethyl phosphate dissolved completely in the aqueous phase.

This silicic acid-hydrogen bonder complex was then isolated as a separate phase by adding 300 grams of sodium chloride to the solution to obtain a salting out effect. The complex separated as a heavy layer which was drawn off from the supernatant aqueous phase containing the water, the added sodium chloride, and the sodium sulfate formed metathetically during the preparation of the silicic acid.

The extraction of the hydrogen bonding agent from the complex thus formed was then effected by diluting the complex with 125 cc. of water to which 1 cc. of 20% sulfuric acid had been added, and extracting this solution with benzene until the triethyl phosphate had been practically completely removed by the benzene. There was obtained an aqueous solution of polysilicic acid having a volume of 175 cc. and containing 24.6% $SiO_2$ and 1.2% triethyl phosphate by weight.

The solution of low molecular weight polysilicic acid thus obtained was found to be useful for treating paper to increase its wet strength and for a variety of other uses. For such purposes the solution was used promptly after preparation since the silicic acid was unstable and polymerized to a gel upon standing.

The preparation of a composition of this invention comprising low molecular weight polysilicic acid in an anhydrous organic solvent is illustrated in Example II.

EXAMPLE II

A solution of low molecular weight polysilicic acid was prepared by mixing, with violent agitation, 50 parts by volume of a sodium silicate solution having an $SiO_2:Na_2O$ mol ratio of 3.37 and a normality with respect to $SiO_2$ of 2.11 with 14.5 parts by volume of a 20% by weight sulfuric acid solution in the presence of 11.5 parts by weight of diethyl acetamide per 65 parts by weight of solution. From this solution 23 parts by weight of a diethyl acetamide-silicic acid complex was salted out by adding 30 parts by weight of anhydrous sodium sulfate. This complex was diluted with an equal weight of anhydrous methanol. To this methanol solution was added 23 parts by weight of benzene and the mixture was agitated and then allowed to stand. The benzene formed a separate layer which contained the hydrogen bonder diethyl acetamide, and which was drawn off leaving polysilicic acid in a substantially anhydrous methanol solution.

This methanol solution contained about 33% by weight of low molecular weight polysilicic acid. It was found useful for increasing the strength of paper and for a variety of other uses.

The preparation of another composition comprising low molecular weight polysilicic acid in an anhydrous diluent is illustrated in Example III.

EXAMPLE III

A silicic acid sol was prepared by adding 400 cc. of a sodium silicate solution, 2 molar with respect to $SiO_2$ dropwise and with vigorous agitation to 430 grams of 7% by weight sulfuric acid solution. The resulting sol contained about 6% $SiO_2$ in the form of low molecular weight polysilicic acid, 4.5% sodium sulfate and 0.6% sulfuric acid and had a pH of 1.5 to 1.6. To this sol there was added 100 cc. of tributyl phosphate as a hydrogen bonding agent, and a complex of the tributyl phosphate with silicic acid was caused to separate as a separate phase by adding 225 grams of sodium chloride. There was obtained 105 grams of the complex as a pale yellow liquid upper layer. The composition of this complex was as follows:

| | Percent |
|---|---|
| Tributyl phosphate | 80.9 |
| $SiO_2$ | 15.8 |
| Water | 2.3 |
| Non-siliceous ash | 1.0 |

A substantially anhydrous solution was prepared from this complex in the following manner: To a solution of 500 cc. of the complex diluted with 500 cc. of anhydrous methanol there was added 1250 cc. of benzene and the mixture was agitated and then allowed to stand. There was obtained as a lower layer 114 grams of a solution of silicic acid in methanol, which was drawn off and analyzed. The product was found to contain 57% $SiO_2$, in the form of polysilicic acid, and 1% tributyl phosphate. It contained also a small amount of benzene.

The product thus obtained when diluted with additional methanol to an $SiO_2$ content of 10% was extremely stable upon storage and showed no substantial degree of polymerization even after several weeks' storage.

The operation of a process of this invention without any dilution of the isolated low molecular weight polysilicic acid and the resultant production of a composition of this invention consisting essentially of low molecular weight polysilicic acid is described in Example IV.

EXAMPLE IV

A solution of low molecular weight polysilicic acid was prepared by mixing 83.2 grams of the hydrogen bonding agent, dimethyl ether of tetraethylene glycol, 52 cc. of water, and 40 cc. of a 20% by weight solution of sulfuric acid and adding to this rapidly stirring solution 125 cc. of a sodium silicate solution which was 2.03 normal with respect to $SiO_2$. From the resultant solution a complex of silicic acid with the dimethyl ether of tetraethylene glycol was separated out by adding, within about 10 minutes of preparation of the solution, 50 grams of anhydrous solution sulfate with rapid agitation. Upon standing, a supernatant layer of the silicic acid-hydrogen bonder complex was formed which weighed 186 grams. Water was removed from this complex by subjecting it to vacuum distillation, the complex remaining undistilled as a substantially anhydrous liquid.

The extraction of the hydrogen bonding agent from this complex was then effected by adding to the complex an equal volume of benzene. A supernatant liquid phase containing the benzene and dimethyl ether of tetraethylene glycol was formed and drawn off leaving the silicic acid as a residue.

The residue thus obtained consisted essentially of low molecular weight polysilicic acid. It was a water-white, viscous liquid which was tacky and adhesive-like; it was hygroscopic and water soluble; it was very strongly acid; it reacted with gelatin in a manner resembling tanning; and it decomposed upon heating to 150 to 300° C. From it there was formed by polymerization silica gels having unique properties.

While in the foregoing description of this invention there have been shown certain specific compositions and certain specific processes, it will be understood that without departing from the scope of this invention one skilled in the art may readily apply various processes and produce various compositions.

I claim:

1. In a process for producing low molecular weight silicic acid compositions, the steps comprising preparing a liquid complex of low molecular weight silicic acid and an organic, liquid hydrogen bonder which is soluble in the complex, and extracting the bonder from the complex by means of a solvent thereby leaving free silicic acid.

2. In a process for producing low molecular weight silicic acid compositions, the steps comprising salting out from an aqueous medium as a separate phase a liquid complex of low molecular weight silicic acid and an organic, liquid hydrogen bonder which is soluble in the complex, and extracting the bonder from the complex by means of a solvent thereby leaving free silicic acid.

3. In a process for producing low molecular weight silicic acid compositions, the steps comprising preparing a liquid complex of low molecular weight silicic acid and an organic, liquid hydrogen bonder which is soluble in the complex, diluting the complex with a liquid, water-miscible diluent, and extracting the bonder from the complex by means of a solvent thereby leaving free silicic acid.

4. In a process for producing low molecular weight silicic acid compositions, the steps comprising preparing a liquid complex of low molecular weight silicic acid and an organic, liquid hydrogen bonder which is soluble in the complex, contains at least one oxygen atom bonded to a carbon atom, and is selected from the group consisting of ethers, amides, ketones, esters of phosphorus oxyacids, and alcohols, and thereafter extracting the bonder from the complex by means of a solvent thereby leaving free silicic acid.

5. In a process for producing low molecular weight silicic acid compositions, the steps comprising preparing a liquid complex of low molecular weight silicic acid and an organic, liquid hydrogen bonder which is soluble in the complex, and extracting the bonder from the complex by means of a liquid, water-insoluble, organic extractant miscible with the bonder thereby leaving free silicic acid.

6. In a process for producing low molecular weight silicic acid compositions, the steps comprising preparing a liquid complex of low molecular weight silicic acid and an organic, liquid hydrogen bonder which is soluble in the complex, and extracting the bonder from the complex by means of a liquid extractant selected from the group consisting of hydrocarbons and halogenated hydrocarbons thereby leaving free silicic acid.

7. In a process for producing low molecular weight silicic acid compositions, the steps comprising preparing a liquid complex of low molecular weight silicic acid and an organic, liquid hydrogen bonder which is soluble in the complex, and extracting the bonder from the complex with benzene thereby leaving free silicic acid.

8. In a process for producing low molecular weight silicic acid compositions, the steps comprising preparing a liquid complex of low molecular weight silicic acid and an organic, liquid hydrogen bonder which is soluble in the complex, and extracting the bonder from the complex with carbon tetrachloride thereby leaving free silicic acid.

9. In a process for producing low molecular weight silicic acid compositions, the steps comprising preparing a liquid complex of low molecular weight silicic acid and an organic, liquid hydrogen bonder which is soluble in the complex, and extracting the bonder from the complex with a paraffin hydrocarbon mixture having a boiling point in the range from 40 to 200° C. thereby leaving free silicic acid.

10. In a process for producing low molecular weight silicic acid compositions, the steps comprising salting out from an aqueous medium as a separate phase a liquid complex of low molecular weight silicic acid and an organic, liquid hydrogen bonder which is soluble in the complex, diluting the complex with a liquid, water-miscible diluent, and extracting the bonder from the complex with a liquid, water-immiscible, organic extractant miscible with the bonder thereby leaving free silicic acid.

11. In a process for producing low molecular weight silicic acid compositions, the steps comprising salting out from an aqueous medium as a separate phase a liquid complex of low molecular weight silicic acid and an organic, liquid hydrogen bonder which is soluble in the complex, diluting the complex with a liquid, water-miscible diluent, effecting contact between the diluted complex and a liquid, water-immiscible, organic extractant miscible with the bonder, whereby the bonder and extractant form a liquid phase distinct from the diluent-silicic acid mixture, and separating the extractant-containing phase from the silicic acid-containing phase.

12. In a process for producing low molecular weight silicic acid compositions, the steps comprising salting out from an aqueous medium as a separate phase a liquid complex of low molecular weight silicic acid and an organic, liquid hydrogen bonder which is soluble in the complex, drying the complex, and extracting the bonder from the complex with a liquid, water-immiscible, organic extractant miscible with the bonder thereby leaving free silicic acid.

13. In a process for producing low molecular weight silicic acid compositions, the steps comprising salting out from an aqueous medium as a separate phase a liquid complex of low molecular weight silicic acid and an organic, liquid hydrogen bonder which is soluble in the complex, drying the complex, diluting the complex with a liquid, non-aqueous, water-miscible diluent, and extracting the bonder from the complex with a liquid, water-immiscible, organic extractant miscible with the bonder thereby leaving free silicic acid.

14. In a process for producing low molecular weight silicic acid compositions, the steps comprising effecting reaction between sodium silicate solution and an acid by mixing them with such agitation that no substantial local concentration of either reactant is present in the mixture and using such proportions of reactants that the pH of the reacted mixture is not above about 3.0, whereby a low molecular weight silicic acid, together with a salt, is formed in solution, adding an organic hydrogen bonder, saturating the resultant mixture with a soluble salt whereby a complex of the low molecular weight silicic acid with the hydrogen bonder is formed as a phase distinct from the resulting aqueous salt solution, the hydrogen bonder being an organic liquid soluble while in the complex phase, separating the bonder-silicic acid complex phase from the aqueous salt solution phase, and extracting the bonder from the complex by means of a solvent thereby leaving free silicic acid.

15. In a process for producing low molecular weight silicic acid compositions, the steps comprising effecting reaction between sodium silicate solution and an acid by mixing them with such agitation that no substantial local concentration of either reactant is present in the mixture and using such proportions of reactants that the pH of the reacted mixture is not above about 3.0, whereby a low molecular weight silicic acid, together with a salt, is formed in solution, adding an organic hydrogen bonder, saturating the resultant mixture with a soluble salt whereby a complex of the low molecular weight silicic acid with the hydrogen bonder is formed as a phase distinct from the resulting aqueous salt solution, the hydrogen bonder being an organic liquid soluble while in the complex phase, separating the bonder silicic acid complex from the aqueous salt solution phase, and extracting the bonder from the complex with a liquid, water-immiscible, organic extractant miscible with the hydrogen bonder thereby leaving free silicic acid.

16. In a process for producing low molecular weight silicic acid compositions, the steps comprising effecting reaction between sodium silicate solution and an acid by mixing them with such agitation that no substantial local concentration of either reactant is present in the mixture and using such proportions of reactants that the pH of the reacted mixture is not above about 3.0, whereby a low molecular weight silicic acid, together with a salt, is formed in solution, adding an organic hydrogen bonder, saturating the resultant mixture with a soluble salt whereby a complex of the low molecular weight silicic acid with the hydrogen bonder is formed as a phase distinct from the resulting aqueous salt solution, the hydrogen bonder being an organic liquid soluble while in the complex phase, separating the bonder-silicic acid complex from the aqueous salt solution phase, diluting the complex with a liquid, water-miscible diluent, effecting contact between the diluted complex and a liquid, water-immiscible, organic extractant miscible with the bonder, whereby the bonder and extractant form a liquid phase distinct from the diluent silicic acid mixture, and separating the extractant-containing phase from the silicic acid-containing phase.

17. In a process for producing low molecular weight silicic acid compositions, the steps comprising effecting reaction between sodium silicate solution and an acid by mixing them with such agitation that no substantial local concentration of either reactant is present in the mixture and using such proportions of reactants that the pH of the reacted mixture is not above about 3.0, whereby a low molecular weight silicic acid, together with a salt, is formed in solution, adding an organic hydrogen bonder, saturating the resultant mixture with a soluble salt whereby a complex of the low molecular weight silicic acid with the hydrogen bonder is formed as a phase distinct from the resulting aqueous salt solution, the hydrogen bonder being an organic liquid soluble while in the complex phase, separating the bonder-silicic acid complex from the aqueous salt solution phase, drying the complex, diluting the complex with a liquid, non-aqueous, water-miscible diluent, effecting contact between the diluted complex and a liquid, water-immiscible, organic extractant miscible with the bonder, whereby the bonder and extraction form a liquid phase distinct from the diluent-silicic acid mixture, and separating the extractant-containing phase from the polysilicic acid-containing phase.

18. In a process for producing low molecular weight silicic acid compositions, the steps comprising salting out from an aqueous medium as a separate phase a liquid complex of low molecular weight silicic acid and the dimethyl ether of tetraethylene glycol, drying the complex, and extracting the dimethyl ether of tetraethylene glycol from the complex with benzene thereby leaving free silicic acid.

19. In a process for producing low molecular weight silicic acid compositions, the steps comprising salting out from an aqueous medium as a separate phase a liquid complex of low molecular weight silicic acid and an organic, liquid hydrogen bonder which is soluble in the complex, contains at least one oxygen atom bonded to a carbon atom, and is selected from the group consisting of ethers, amides, ketones, esters of phosphorus oxyacids, and alcohols, and thereafter extracting the bonder from the complex with a liquid, water-insoluble, organic extractant miscible with the hydrogen bonder thereby leaving free silica acid.

20. In a process for producing low molecular weight silicic acid compositions, the steps comprising salting out from an aqueous medium as a separate phase a liquid complex of low molecular weight silicic acid and triethyl phosphate, diluting the complex with methanol, and extracting the triethyl phosphate from the complex with benzene thereby leaving free silicic acid.

21. In a process for producing low molecular weight silicic acid compositions, the steps comprising salting out from an aqueous medium as a separate phase a liquid complex of low molecular weight silicic acid and tertiary butyl alcohol, diluting the complex with methanol, and extracting the tertiary butyl alcohol from the complex with benzene thereby leaving free silicic acid.

22. A composition consisting essentially of low molecular weight silicic acid characterized by being a water-white, viscous liquid which is tacky and adhesive-like, hygroscopic, water soluble, strongly acid, reactive with gelatin in a manner resembling tanning, and by being decomposed upon heating to 150 to 300° C.

JOHN W. ROBINSON, Jr.

Certificate of Correction

Patent No. 2,392,767.　　　　　　　　　　　　　　　　　　January 8, 1946.

JOHN W. ROBINSON, Jr.

It is hereby certified that errors appear in the printed specification of the above numbered patent requiring correction as follows: Page 3, first column, line 8, for "Ethers" read *Esters*; page 4, first column, line 40, for "Polysilic acid" read *Polysilicic acid*; page 6, second column, lines 37 and 38, Example IV, for "anhydrous solution sulfate" read *anhydrous sodium sulfate*; page 8, second column, line 6, claim 17, for "extraction" read *extractant*; line 32, claim 19, for "silica acid" read *silicic acid*; and that the said Letters Patent should be read with these corrections therein that the same may conform to the record of the case in the Patent Office.

Signed and sealed this 13th day of August, A. D. 1946.

[SEAL]

LESLIE FRAZER,
*First Assistant Commissioner of Patents.*